Figure 1:
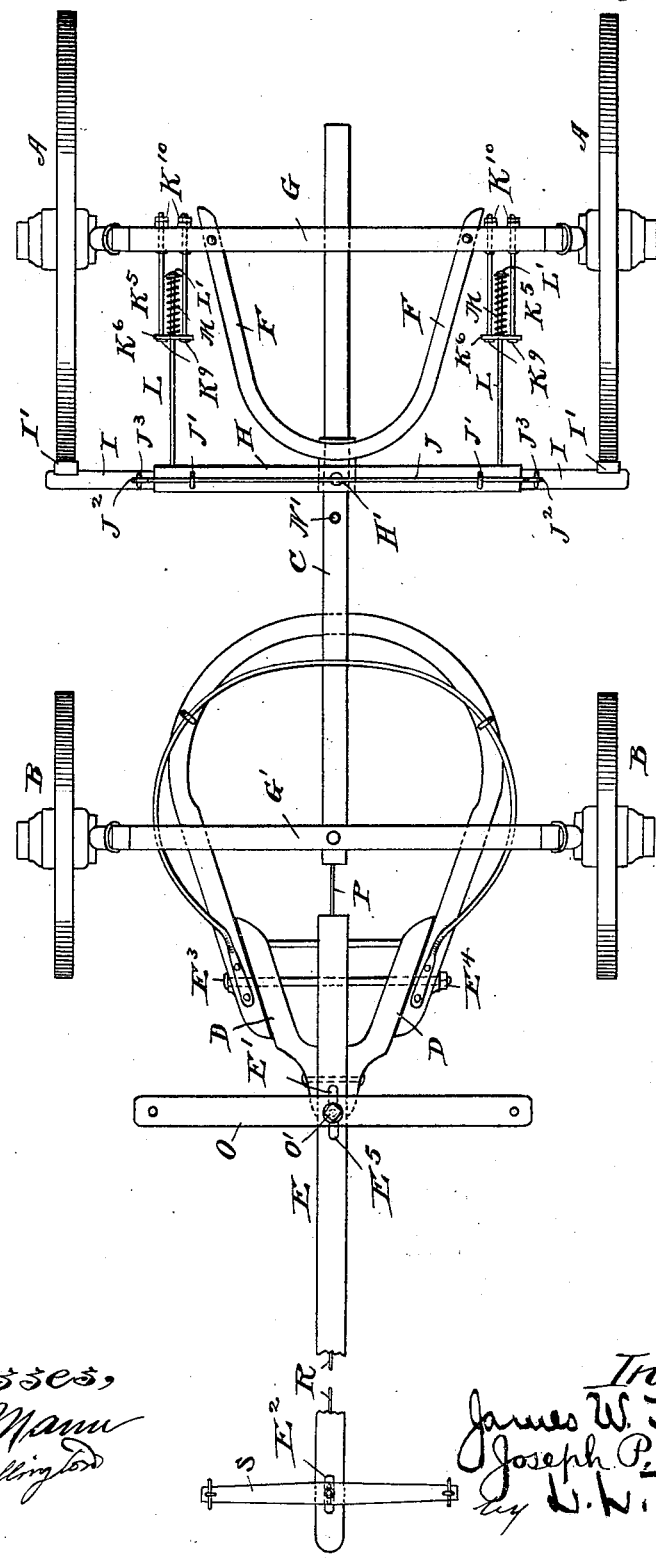

No. 676,559. Patented June 18, 1901.
J. W. T. & J. P. IRWIN.
BRAKE FOR WAGONS.
(Application filed Sept. 8, 1900.)

(No Model.) 2 Sheets—Sheet 1.

Witnesses,
Inventors,
James W. T. Irwin,
Joseph P. Irwin,
by L. L. Morrison
Atty.

THE NORRIS PETERS CO., PHOTO-LITHO., WASHINGTON, D. C.

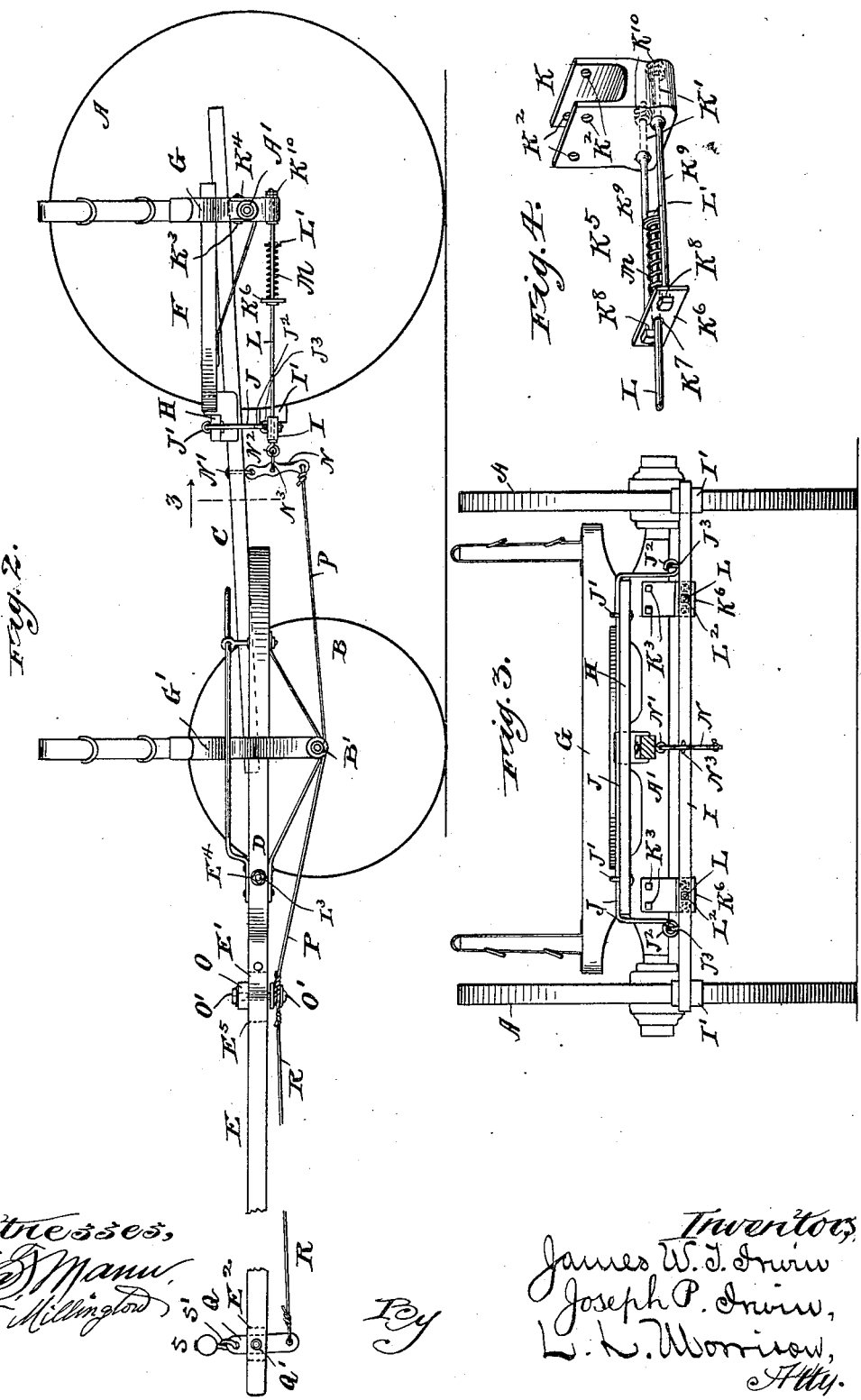

UNITED STATES PATENT OFFICE.

JAMES W. T. IRWIN AND JOSEPH PAUL IRWIN, OF KENWOOD, MISSOURI, ASSIGNORS OF ONE-THIRD TO JOHN M. IRWIN, OF FREEPORT, ILLINOIS.

BRAKE FOR WAGONS.

SPECIFICATION forming part of Letters Patent No. 676,559, dated June 18, 1901.

Application filed September 8, 1900. Serial No. 29,431. (No model.)

*To all whom it may concern:*

Be it known that we, JAMES W. T. IRWIN and JOSEPH PAUL IRWIN, citizens of the United States of America, residing at Kenwood, in the county of Knox and State of Missouri, have invented certain new and useful Improvements in Brakes for Wagons, of which the following is a specification.

Our invention relates specifically to a brake so contrived that it will automatically brake the wheels of a wagon whenever its propelling force ceases to act thereon and that will release such wheels whenever propelling force is reapplied thereto to propel the wagon either backward or forward; and it consists of certain new and useful features of construction and combinations of parts hereinafter fully described, and specifically pointed out in the claims.

Referring to the accompanying drawings, which form a part of this specification, Figure 1 is a top plan view of a wagon, minus its body, provided with our improvement. Fig. 2 is a side elevation of the same, minus the wheels on the side next to the observer, and the spokes of the remaining wheels. Fig. 3 is a section at the line 3 in Fig. 2 of parts there shown. Fig. 4 is a detailed isometric view of the brake-springs and combined devices for operatively connecting them with the running-gear of the wagon.

Like letters of reference indicate corresponding parts throughout the several views.

A represents the rear wheels of a wagon which are connected together by means of an axle A'.

B represents the front wheels of a wagon and are connected together by means of an axle B'.

C is a reach connecting the axles A' B' in the usual manner.

D represents the front hounds of the wagon.

E is the wagon-tongue, having vertical longitudinal slots E' E² therethrough for purposes to be explained hereinafter and is connected with the hounds D by means of a bolt and nut E³ E⁴.

F represents the rear hounds of the wagon.

G G' are the rear and front bolsters of the same.

H is a brake-beam supporting-bar and is secured to the reach C by means of a bolt H', passed through both of the same.

I is a brake-beam provided with shoes I', adapted to engage the peripheries of the wheels A and suspended from the bar H by means of the rocking bail J, which has bearings J' on the bar H and terminates in hooks J², engaging eyes J³ thereon.

K represents spring-case supporting-clamps having transverse rod-holes K' and bolt-holes K² therethrough and secured to the axle A' by means of bolts and nuts K³ K⁴.

K⁵ represents spring-cases composed, preferably, of base-plates K⁶, having transverse openings K⁷ K⁸ therein for purposes to be explained hereinafter, and substantially parallel rods K⁹, passing transversely through the holes K⁸ K⁷ in the plates K⁶ and clamps K, whereinto they are secured by means of nuts K¹⁰.

L represents brake-rods provided with large heads L' on their free ends and passed through the holes K⁷ in the base-plates K⁶ and also through the brake-beam I, whereinto they are secured by means of nuts L², turned thereon.

M represents spiral compression-springs included endwise between the base-plates K⁶ and rod-heads L' and having the portions of the brake-rods L located between the base-plates K⁶ and rod-heads L' as longitudinal axial supports.

N is a lever pivoted, by means of the eyebolt N', to the reach C and connected at any desired point between its ends by means of the eyebolt N² and link N³ with the brake-beam I.

O is a doubletree connected with the tongue E by means of a bolt O' passing therethrough and through the longitudinal slot E' therein.

P is a small wire cable connecting the free end of the lever N with the lower end of the doubletree-bolt O'.

Q is a lever pivoted, by means of a pintle Q', at any desired point between its ends in the slot E² in the tongue E.

R is a small wire cable connecting the lower end of the lever Q with the lower end of the doubletree-bolt O'.

S is a neck-yoke connected, by means of a hook S', with the upper end of the lever Q.

In Figs. 1 to 3 of the drawings the brake is shown as braking with the full force of the springs M the hind wheels A of the wagon.

Suppose a team of draft-animals to be hitched to the wagon and that they move forward to draw the wagon. The doubletree-bolt O' will also move simultaneously forward in the slot E' until it strikes the front end $E^5$ thereof, thereby withdrawing, through the connections P N I, the brake-shoes I' from contact with the peripheries of the wheels A. Whenever the team stops, whether it be going up hill or down, the brake-shoes I' are thrown by the springs M, acting through the brake-beam I, promptly into contact with the wheels A, thereby braking them. If it is desired to back the wagon, a backward movement of the team, acting upon the neck-yoke S, will, through the connections S Q R O' P N I, withdraw, and hold withdrawn so long as the operation of backing continues, the brake-shoes I' from contact with the wheels A'.

What we claim as new, and desire to secure by Letters Patent, is—

1. In a brake for wagons, in combination, a brake-beam provided with shoes, adapted to engage the peripheries of the wagon-wheels and suspended from the running-gear thereof by means of a rocking bail, spring-case supporting-clamps, having transverse rod-holes therethrough and secured to the hind axle thereof, spring-cases composed of base-plates having transverse openings therein and rods passing transversely through the supporting-clamps and base-plates, brake-rods, provided with large heads, on their free ends, and passed through holes in the base-plates and brake-beam, spiral compression-springs inclined, endwise, between the base-plates and heads of the brake-rods, a doubletree so mounted as to be capable of reciprocatory motion in the direction of the length of the wagon-tongue, and means for connecting the doubletree with the brake-beam, substantially as and for the purpose specified.

2. In a brake for wagons, in combination, a brake-beam provided with shoes, adapted to engage the peripheries of the wagon-wheels and suspended from the running-gear thereof by means of a rocking bail, spring-case supporting-clamps, having transverse rod-holes therethrough and secured to the hind axle thereof, spring-cases composed of base-plates having transverse openings therein and rods passing transversely through the supporting-clamps and base-plates, brake-rods, provided with large heads, on their free ends, and passed through holes in the base-plates and brake-beam, spiral compression-springs inclined, endwise, between the base-plates and heads of the brake-rods, a vertical lever mounted, at any desired point between its ends, in a vertical slot in the free end of the wagon-tongue, a neck-yoke connected with the upper end of the vertical lever, and means for connecting the lower end of the vertical lever with the brake-beam, substantially as and for the purpose specified.

In testimony whereof we have signed our names to this specification in the presence of subscribing witnesses.

JAMES W. T. IRWIN.
JOSEPH PAUL IRWIN.

Witnesses for James W. T. Irwin:
T. M. STONER,
J. D. STONER.

Witnesses for Joseph P. Irwin:
RICHARD BARNARD SWAYNE,
FRANK BENJAMIN DAVIS.